UNITED STATES PATENT OFFICE.

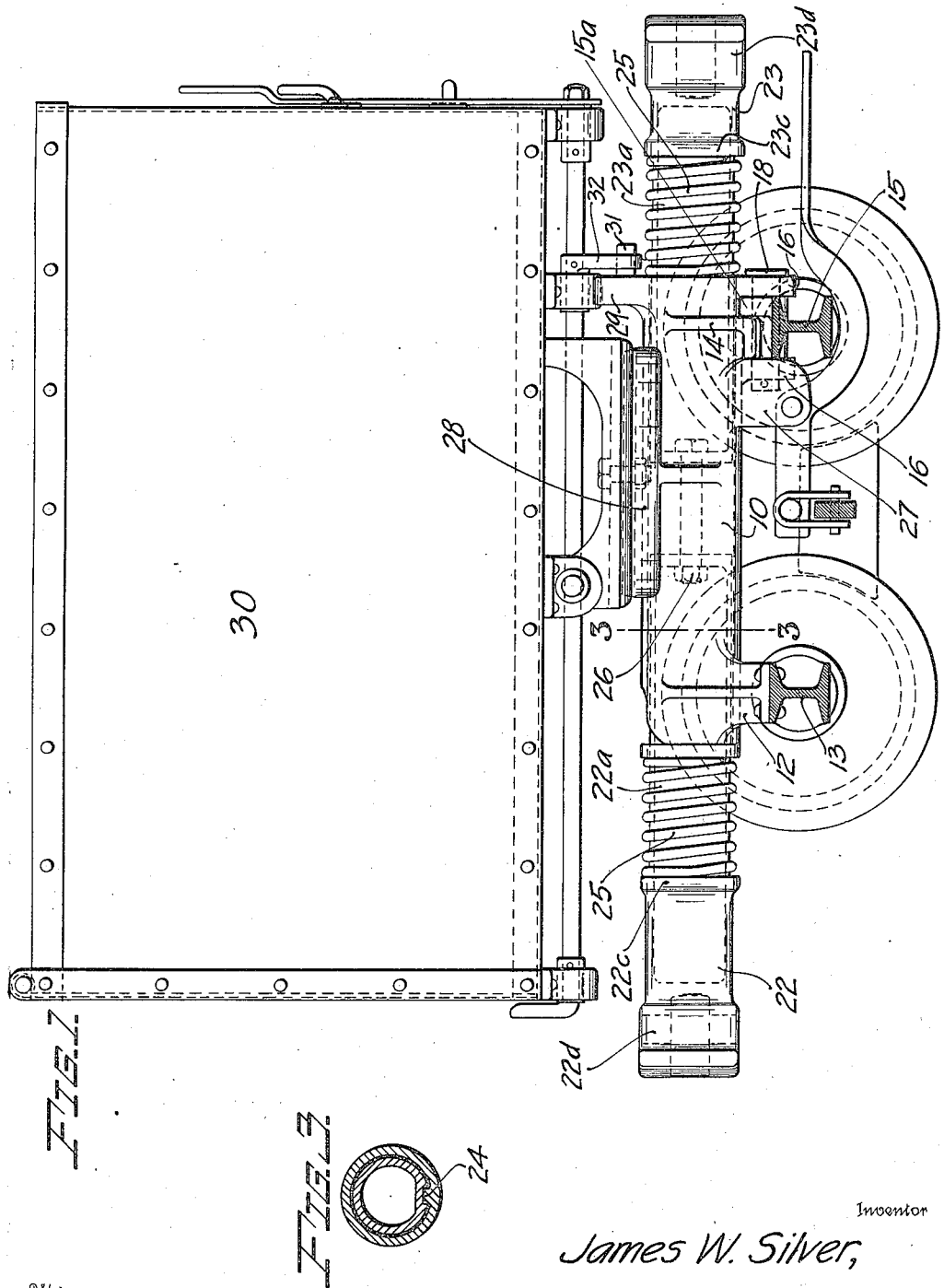

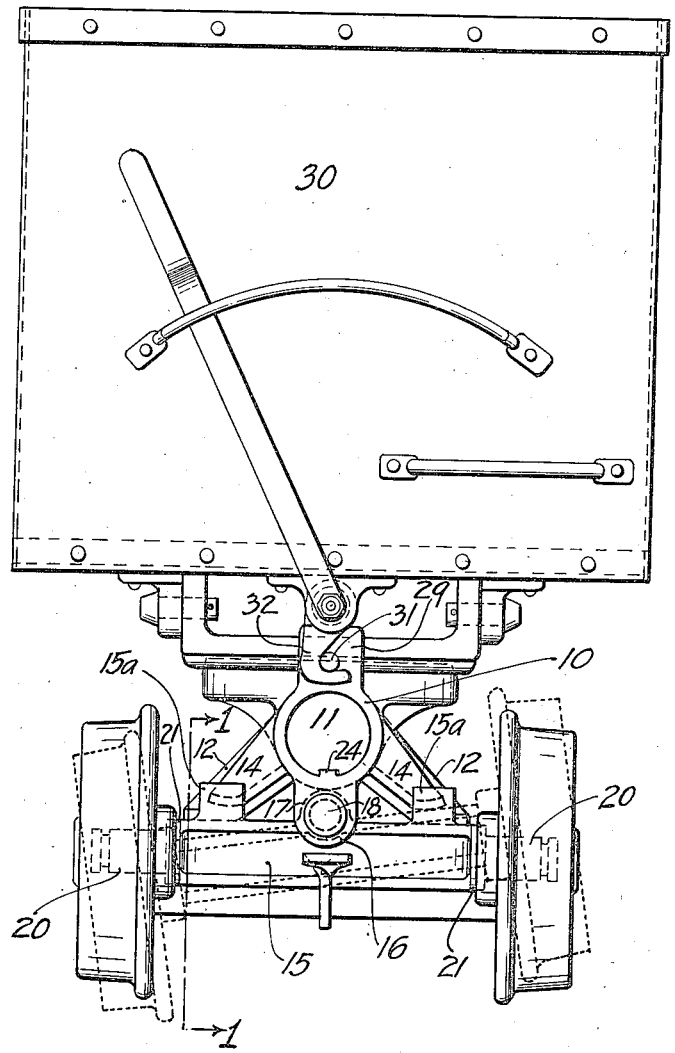

JAMES W. SILVER, OF SALT LAKE CITY, UTAH.

ORE-CAR.

1,262,108.

Specification of Letters Patent.

Patented Apr. 9, 1918.

Application filed October 21, 1915. Serial No. 57,194.

*To all whom it may concern:*

Be it known that I, JAMES W. SILVER, a citizen of the United States, and a resident of Salt Lake City, in the county of Salt Lake and the State of Utah, have invented certain new and useful Improvements in Ore-Cars, of which the following, together with the accompanying drawings, constitutes a full, clear, and exact specification, which will enable others skilled in the art to which my invention appertains to make and use the same.

My invention relates to ore cars and it embraces novel features in the construction of the trucks for the same, of which the principal objects are: First:—To obtain by simple means a wheel base which is flexible, in a vertical direction thus enabling the wheels to conform themselves to the unevenness of the usual mine tracks and preventing many derailments. Second:—The arrangement of the drawheads and the truck frame in such a way, that where a train of ore cars is employed, the impact of the train upon the individual cars is transmitted through solid masses of metal end to end. Third:—To provide for a cushioning effect between the drawheads and the truck frame which will be effective for either a push or a pull on the drawhead. Fourth:—To so construct the truck frame that the drawheads may be omitted if it is desired to use the cars singly, and yet to allow for the easy application of the drawheads at any time that it may be desired to operate the cars in trains.

The features upon which protection is desired, are summarized in the appended claims.

In the drawings, Figure 1, shows a side elevation partly in section on line 1—1 in Fig. 2, of an ore car of the usual type, in which my improvements in one form, are embodied. Fig. 2, shows an end elevation of the same, but with the drawheads omitted, and Fig. 3, shows a section taken on the line 3—3 in Fig. 1.

Throughout the different views similar parts are designated by similar numerals.

Referring to the drawings, (10) shows the truck frame which may be a single casting, preferably of steel and which has extending through it, the longitudinal opening (11) which can be of any suitable shape. At one end, the frame (10) has the feet (12) resting on, and riveted directly to, one axle (13), and at the other end of the frame (10) are the arms (14) which, it will be noticed do not normally rest on the other axle (15), but have their lower ends spaced somewhat apart therefrom. At (15ª) are steadying lugs or guards to bear against the arms (14).

Located above the axle (15), the frame (10) has two depending lugs (16) between which, and in alinement therewith, is the lug (17) projecting upward from the axle (15), the pivot pin (18) extending through the three lugs, thus forming a hinge joint between the frame (10) and the axle (15).

This arrangement allows the axle (15) with its wheels (19) to oscillate around the pin (18) in a vertical plane, within the limits defined by the contact on either side of the pin (18) by the bottoms of arms or stops (14) upon the top of the axle (15). This limit of oscillation of the axle (15) and its wheels (19) (to the one side) is shown by the dotted lines in Fig. 2. The axles (13) and (15) may have their central portions of an I-shaped section while the shanks (20) and the collars (21) are of the usual forms, the entire axles, however, being preferably single castings of steel.

At (22) and (23), are shown the drawheads whose shanks (22ª) and (23ª) respectively, are hollow and of an exterior cross section conforming to the opening (11) in which they are adapted to slide back and forth. When the opening (11) is of a circular cylindrical shape, as in this instance, the drawheads are prevented from turning therein by the ribs (24) which engage corresponding grooves in the shanks (22ª) and (23ª).

The drawheads (22) and (23) are acted upon by the compression springs (25), one of which encircles the shank (22ª) and the other the shank (23ª). The springs (25) have each, one bearing against the frame (10) and another bearing against the corresponding collar (22ᶜ) and (23ᶜ) forming parts of the drawheads (22) and (23) respectively.

The rear portion of each of the shanks (22ª) and (23ª) may be closed and the two shanks may be connected by the bolt (26) which can be screwed up to bring the springs (25) under the desired compression.

The bumpers on couplers (22ᵈ) and (23ᵈ) may be of any desired type.

It will readily be seen that when a car embodying my improvements is in a train, the stress caused by the pushing of the train is taken on a bumper and transmitted directly through the adjacent spring to the frame casting and on through the second spring and second bumper to the next car. The stress caused by the pulling of the train is transmitted from the coupler at one end of the car, longitudinally through the bolt (26) to the coupler at the other end of the car, and then through the coupler to the next car. In this instance the drawbars of the various cars in the train act together as one long drawbar, with each car cushioned thereon by its own individual springs, the pressures exerted by the opposing springs ordinarily balancing each other. It is evident that this general arrangement of the drawbars could be used advantageously on railroad cars or on any other vehicles that might be made up into trains.

The frame may have cast integral therewith, the depending lugs (27), the lower part (28) of the usual turntable and the stop (29). The lugs (27) support the usual brake rigging and the stop (29) supports one end of the car body (30), and carries the projecting pin (31) for engaging the dog (32) which holds the car body in its normal position.

The remaining parts of the car are not included in my invention and may be constructed in the usual manner.

Having fully described my invention, what I claim is:—

1. In an ore car, the combination with a suitable body and the usual appurtenances, of a truck frame having a suitable opening lengthwise therethrough, with opposing drawheads movably disposed in the said opening, mutually opposing springs adapted to bear against the said truck frame and against the said opposing drawheads and means for connecting the said opposing drawheads to each other, a wheeled axle rigidly disposed under one end of the said frame, and a second wheeled axle pivotally disposed (in a vertical direction) under the other end of the said frame for the purpose specified.

2. In an ore car, the combination with a suitable body, and with suitable axles and wheels, of a truck frame, mutually opposing drawheads movably disposed therein, means for causing mutually opposing yielding pressures to bear between the said frame and the said drawheads, means for adjustably connecting the said opposing drawheads to each other, a wheeled axle rigidly disposed under one end of the said frame, and a second wheeled axle pivotally disposed (in a vertical direction) under the other end of the said frame for the purpose specified.

3. In an ore car, the combination with a one-piece frame casting having a turntable thereon, of a body mounted on the said turntable, a wheeled axle rigidly disposed under the said frame casting at one end thereof, a second wheeled axle pivotally disposed (to move in a vertical direction) under the said frame casting at the other end thereof, and yoked drawbars movably mounted in the said frame casting with means for yieldingly holding the said drawbars in certain normal positions with reference to the frame casting.

4. In a truck-supported car, the combination therewith, of suitably disposed guides, mutually opposed drawbars movably mounted in the said guides, mutually opposing springs suitably seated, each of the said springs exerting a relatively outward pressure against the corresponding drawbar; a relatively unyielding connection from drawbar to drawbar adapted to allow the said opposing springs to exert their pressures against each other, a wheeled axle rigidly disposed under one end of the said frame, and a second wheeled axle pivotally disposed (in a vertical direction) under the other end of the said frame as specified.

5. In a car, the combination with a suitable body, of a supporting truck frame suitably mounted thereunder; an axle flexibly connected at its center to one end of the said truck frame so as to be movable in a vertical direction; suitably disposed rigid arms projecting from the said truck frame, the outward ends of the said arms being located directly over, and spaced somewhat apart from, the said axle; and a second axle rigidly connected to the other end of the said truck frame, all as described.

6. In a car having a one-piece truck frame, the combination with a hollow main body adapted to have drawheads mounted therein, of a turntable portion suitably located on the top of the said main body; downwardly projecting feet at one end of the said main body, the said feet being adapted to have an axle suitably fastened thereto; downwardly projecting lugs at the other end of the said main body, the said lugs being adapted to pivotally hold a second axle; and arms projecting downwardly from the said main body and having their outer ends adapted to bear on the said second axle, all as described.

7. In a car, the combination with a suitable truck body, of laterally extending feet at one end thereof, an axle rigidly secured to the said feet; a vertically oscillating axle secured to the other end of the said truck body, and laterally extending arms suitably positioned on the said truck frame for limiting the extent of motion of the said oscillating axle.

8. In a car, a tubular truck body with feet approximately radial therewith, extending outwardly from one end thereof; arms, approximately radial therewith, extending outwardly from the other end of the said truck body; lugs depending from the said truck body intermediate the said arms, and an oscillating axle adapted to contact the extremities of the said arms, the said oscillating axle being so disposed that it may be secured in the said lugs and be normally spaced apart from the extremities of the said arms for the purpose specified.

9. In a car, the combination with a tubular truck body, of laterally extending feet at one end thereof, an axle rigidly secured to the said feet; laterally extending arms at the other end of the truck body, and a vertically oscillating axle secured to the said truck body in a manner that will allow the said arms to limit the extent of the motion of the said oscillating axle, for the purpose specified.

10. In a car, the combination with a suitable truck body, of an axle rigidly secured to one end thereof, a vertically oscillating axle suitably secured to the other end thereof, suitably positioned stops for limiting the extent of motion of the said oscillating axle, and suitably positioned guards for holding the said oscillating axle in alinement with the said stops.

In testimony that I claim this invention as my own, I have signed my name hereto in the presence of two subscribing witnesses.

JAMES W. SILVER.

Witnesses:
J. MOYLE GRAY,
LOUISE M. SILVER.